United States Patent [19]

Istvanffy et al.

[11] 4,231,506
[45] Nov. 4, 1980

[54] METHOD OF WELDING METAL PIPE SECTIONS WITH EXPLOSIVES

[75] Inventors: Stephen M. Istvanffy, Beaconsfield, Canada; Vonne D. Linse, Columbus, Ohio

[73] Assignee: Canadian Industries Limited, Montreal, Canada

[21] Appl. No.: 40,515

[22] Filed: May 21, 1979

[51] Int. Cl.³ .............................................. B23K 20/08
[52] U.S. Cl. ................................................... 228/109
[58] Field of Search ....................... 228/107, 108, 109; 29/421 E

[56] References Cited

U.S. PATENT DOCUMENTS

| 3,455,017 | 7/1969 | Zondag | 29/421 E X |
| 3,730,096 | 5/1973 | Prior | 102/27 R |
| 3,732,612 | 5/1973 | Simon | 228/108 |
| 3,744,119 | 7/1973 | Hanson et al. | 228/109 |
| 3,797,098 | 3/1974 | Bement | 228/107 |
| 3,868,762 | 3/1975 | Nilsson | 228/107 |
| 3,910,478 | 10/1975 | Howell et al. | 228/107 X |
| 3,985,279 | 10/1976 | Wilson et al. | 228/109 |

OTHER PUBLICATIONS

Anderson *Explosive Welding*, Welding Institute, Cambridge, Gt. Britain 1976, pp. 31–33

*Primary Examiner*—Kenneth J. Ramsey
*Attorney, Agent, or Firm*—Donald G. Ballantyne

[57] ABSTRACT

A method is provided for the explosive welding together of sections of large diameter metal pipe of the kind used in the construction of high volume oil and gas pipelines. In the method, internal and external band charges of welding explosive are simultaneously detonated adjacent to overlapped telescoped pipe ends. The welding charges are detonated simultaneously by means of very high detonation velocity initiation explosive charges placed along a leading edge of each welding explosive charge. The initiating explosive charges are each set off by a single detonator means. The velocity of detonation of the initiating explosive is selected so that welding charges are simultaneously detonated around the pipes while maintaining the detonation fronts at superimposed locations and at a large angle to the pipe axis. This avoids unbalancing forces on the pipes and minimizes the collision of circumferential shock waves thus preventing pipe damage and imperfect welds.

7 Claims, 2 Drawing Figures

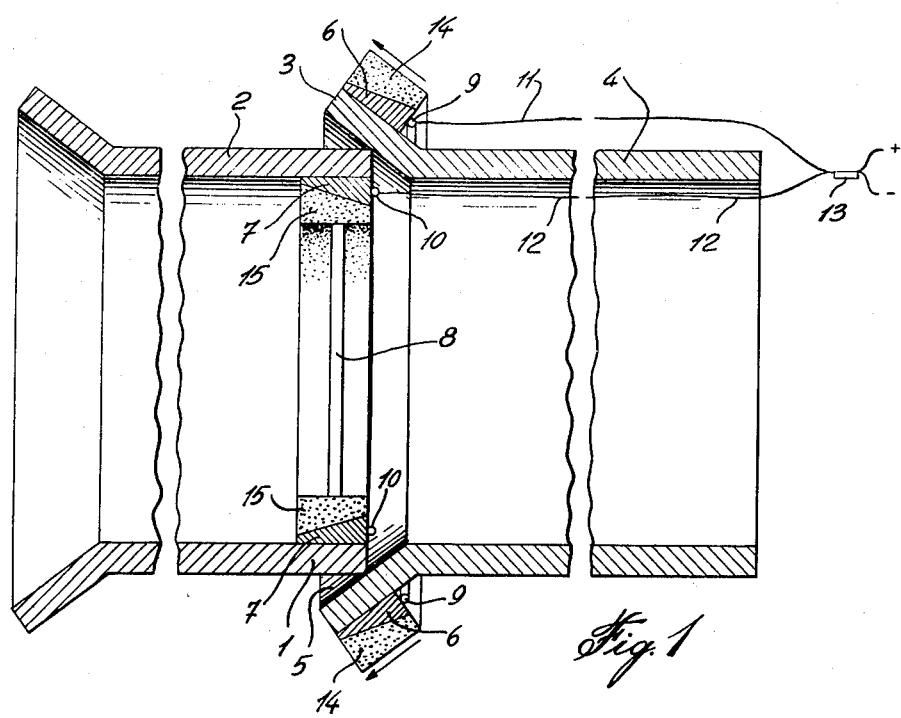
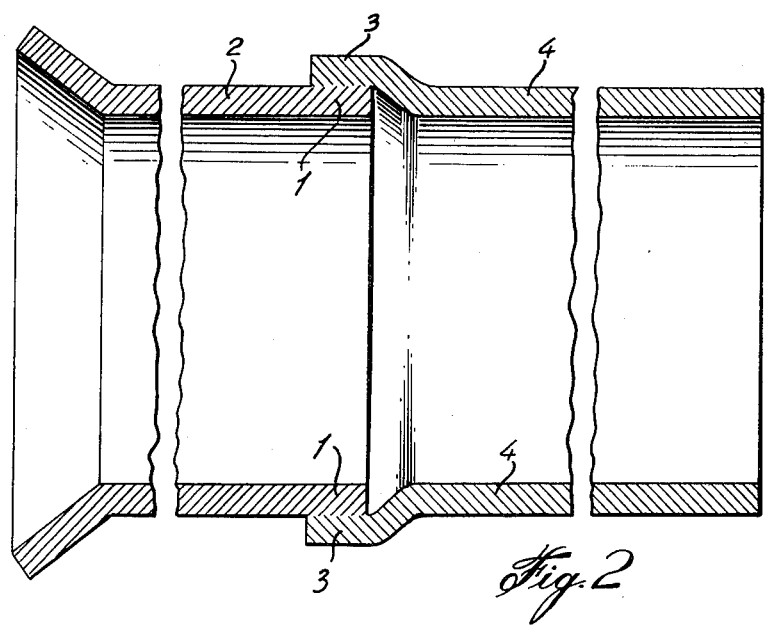

METHOD OF WELDING METAL PIPE SECTIONS WITH EXPLOSIVES

This invention relates to the art of metal welding with explosives. More particularly, the invention is concerned with the joining together by explosive welding of sections of large diameter steel pipe as are used, for example, in the construction of major oil and gas pipelines.

Since the early disclosures by Philipchuk and Bois in U.S. Pat. No. 3,024,526 and by Cowan and Holtzmann in U.S. Pat. No. 3,137,937 of the utility of bonding together supported metal layers by the initiation of an adjacent explosive charge, workers in the art have devoted considerable effort to adapting this technique to the welding together of metal pipe sections. A number of patents have been granted reflecting these endeavors. A brief review of some of these patents will be helpful in appreciating the background in the art which led to the present invention.

In U.S. Pat. No. 3,140,537 (Popoff) a process is disclosed for bonding together the outside wall of one metal tube and the inside wall of a second metal tube in, for example, the lining of tubes and pipes. Popoff places his tubes concentrically together, places an explosive charge internally throughout the length of the tubes and detonates the explosive. The detonation energy bonds the tubes together. In this process constraint or support is provided around the outside tube to prevent damaging or bulging in the area of the bond. In U.S. Pat. No. 3,263,323 (Maher et al.), a method is provided for making a circumferential explosive-welded joint at two telescoped tube ends. Maher et al. flare one end of a tube to an acute angle and place the straight end of another tube within and engaging the flare. A continuous layer of explosive is placed around the flange and a solid supporting die is positioned within the tubes adjacent to the explosive. Upon detonation of the explosive, the flange is driven against the mated tube and is welded thereto and the die is then withdrawn. Alternatively, an inwardly tapered section of the inner tube of a mated pair can be provided. In this case an inner band of explosives and an outer support die is employed. While in the example provided by Maher et al., only a comparatively small tube diameter of 9½" was welded, Maher et al. recognize the problem of possible damage to the tube at the point of meeting of the circumferentially moving shock waves at a position 180° from the location of the point of initiation of the explosive. Maher et al. provide an additional layer of reinforcing metal at this point. In U.S. Pat. No. 3,455,017 (Zondag), the welding of both flared tube ends and butted and sleeved tube ends is described using a single, circumferential outside explosive charge. To avoid the problem of damage caused by the multiple effect of colliding circumferential shock waves, Zondag proposes initiating the welding explosive charge by means of a low detonation velocity explosive strip placed at an angle to the welding explosive. This is alleged to encourage propagation of the explosive in a direction along rather than around the pipe and avoids pipe damage. In U.S. Pat. No. 3,535,767 (Doherty and Knop) there is disclosed, inter alia, the use of simultaneously initiated inside and outside explosive charges adjacent overlapped, intimately contacting tube sections. In this method the support of an equal and opposite counter-balancing explosive force is suggested instead of a supporting mandrel or die. In U.S. Pat. No. 3,744,119 (Hanson et al.) a method is described for welding together parallel, spaced-apart tube sections using simultaneously initiated inside and outside explosive charges. The explosive charges, in the form of hollow cylinders, are initiated at a number of points around the entire circumference of the cylindrical charges and at a leading edge thereof. This permits the detonation wave fronts from the explosives to travel in a direction mainly parallel to the longitudinal axis of the tubes thus eliminating colliding shock wave fronts. In U.S. Pat. No. 3,819,103 (Howell et al.) the welding of butted pipe sections by means of an overlayed metal sleeve or collar, a single external circumferential explosive ring charge and a moveable internal mandrel is disclosed. The explosive charge is initiated by means of a large number of blasting caps positioned around the entire explosive ring charge and detonated simultaneously. In U.S. Pat. No. 3,910,478 (Howell et al.), the welding of butted and sleeved pipe sections is described. A single external explosive charge is detonated over a metal sleeve which embraces the butted pipe ends and an internal mandrel is employed adjacent the sleeve. The welding explosive charge is initiated by means of a second explosive ring primer charge which has a higher detonation velocity than the principal welding explosive charge which primer charge is indented into and is positioned around the welding charge at a mid-point thereof. Initiation of the welding charge by the high velocity primer charge is said to avoid or minimize stress caused by circumferentially colliding shock waves.

None of the above-described meritorious inventions have fully solved the problems associated with providing a convenient, safe and economic method for the welding of metal pipe sections to provide welds which meet all of the requirements of the pipeline industry and the standards of government agencies, particularly in the welding of large diameter pipe of, say, 24" (61 cm) diameter or greater. Practical problems connected with the explosive welding of very large diameter pipe, often under conditions of severe climate such as in arctic areas, are necessarily much greater than those connected with the welding of small diameter pipe. While many of the previously disclosed methods may be used in the welding of smaller pipe, these methods are not easily transferred to the welding a large diameter, thick-walled pipe. Heretofore, large diameter pipeline sections have been joined by conventional non-explosive welding methods. These methods have become very costly especially when pipelines are constructed in remote areas, in cold climate or in rough terrain. What the pipeline industry has sought is an easily employed explosive welding method which may be used with a minimum of preparation time or auxiliary apparatus and which will result in economics of construction. At the same time a quality of weld at least as good as that produced by convention welding methods is required. The method of the present invention fills all of these requirements.

Essentially the method of welding of the present invention takes into account the following features which are deemed essential to the explosive welding of large diameter pipeline sections under severe conditions of weather or terrain;

(a) The sections of large diameter pipe for welding together, usually 20 feet or more in length, must arrive at the site of pipeline construction in a form ready for simple assembly. All special forming, shaping or surface preparation of the pipe sections should be done at the pipe factory and no further shaping or other preparation should be required at the construction site;

(b) The explosive charge or package used to produce the welded connection must be in a ready-to-use form and should require no further assembly except for this connection of a single, simple initiation means. The explosive package must be of low cost;

(c) The means for initiating the explosive welding charge must be simple, safe, fool-proof, reliable and convenient; and (d) The welding charge must produce a high quality weld without damaging or weakening the material of the pipe.

The welding method of the present invention essentially comprises the steps of:

(a) Positioning the ends of two metal pipe sections together in male/female telescoping relationship, the female pipe end being flared outward at an acute angle to the wall of the pipe and the male pipe end being in contact with the inside circumference of said female flared section;

(b) providing a first continuous band of welding explosive against the exterior surface of the said female flared section, (c) providing a second continuous band of welding explosive against the interior surface of said male pipe end so that the two explosive bands are in a position substantially concentric and adjacent on opposite sides of the telescoped region;

(d) providing initiating means for the detonation of said welding explosive band charges, said initiating means comprising an elongated cord-like charge of high explosive having a velocity of detonation at least 50 percent (50%) greater than the velocity of detonation of the welding explosive in said band charges, said elongated high explosive initiating charge resting in contact with the edge of each band welding explosive charge closest to the narrow diameter of said flared pipe area; and (e) detonating said welding explosive charges simultaneously at single adjacent points on each charge so that detonation shock wave fronts are produced to move in pairs simultaneously around the pipe at superimposed locations and at a large angle to the pipe axis to drive together said female flange section and said adjacent male pipe end to form a welded joint.

Optionally and preferably the explosive charges are covered with tamping material.

As has been observed in the prior art in, for example, U.S. Pat. Nos. 3,455,017; 3,744,119 and 3,910,478, a principal difficulty associated with the welding of circumferential shapes such as tanks, tubes or pipes using circumferential explosive charges is the damage caused to the metal and the imperfect welds produced as a result of the colliding circumferentially-moving shock waves. To avoid such damage it has been proposed to initiate the welding explosive charge by means of an angularly applied strip of low detonation velocity explosive U.S. No. 3,455,017), to initiate the end or edge of an explosive band charge by means of a large number of initiators set around the circumference of the charge and detonated simultaneously U.S. No. 3,744,119) or to initiate the explosive band charge by means of a train of high velocity explosive indented into a shaped explosive charge at a point equidistant from each edge thereof, which high velocity explosive is initiated by means of two or more equidistantly spaced detonators (U.S. Pat. No. 3,910,478). In particular, U.S. Pat. No. 3,910,478 notes that the detonation velocity of the initiating explosive should be about 20% to about 35%, preferably 30%, greater than the detonation velocity of the welding charge in order to prevent the head-on collision of the circumferential wave fronts. In the present invention advantage is taken of the known technology to provide an improved pipe welding method wherein the explosive welding charge is initiated by means of a very high VOD initiating charge which produces shock fronts in the welding explosive charges moving around the pipe at a very large angle to the pipe axis. At the termination point, the shock fronts meet at a very large angle and hence the damaging effect of any colliding circumferential wave fronts is reduced.

The present invention is further described in and may be more fully understood by referring to the accompanying drawing (not to scale) in which:

FIG. 1 is a cross-sectional view of two telescoped pipe ends ready for explosive welding;

FIG. 2 is a cross-sectional view of the pipe ends of FIG. 1 after welding.

Referring to the drawing, 1 represents the surface cleaned end of a male steel pipe section 2 of, say, 48 inch (122 cm) diameter. The wall thickness of pipe 2 is approximately 0.75 inch (1.9 cm). Numeral 3 represents the expanded or flared and cleaned end of a female pipe section 4 of similar wall thickness as pipe 2. Flared end 3 describes the acute angle of from about 5° to about 8°, preferably 6°, when male pipe end 1 is fitted into and against the inner cleaned surface 5 of flared end 3. A band charge of explosive 6 preferably having a tapered, wedge-shaped or stepped cross-section is positioned in contact with the outside face of flared end 3. A second equivalent band charge of explosive 7 of similar cross-sectional shape to charge 6 is positioned in contact with the inside face of pipe end 1 at a position which underlayes explosive charge 6. The leading edges of charges 6 and 7 are aligned with the ends of pipes 2 and 4. Packaged tamping material 14 and 15 in the form of, for example, packaged sand, may be overlayed against and on top of the charges 6 & 7. Charge 7 may be held in position against the inner face of pipe end 1 by means of, for example, support spokes 8. At one edge of explosive charge 6 and in initiating circumferential contact therewith is a cord-like explosive charge 9. A similar cord-like explosive charge 10 is in initiating circumferential contact with a corresponding edge of explosive charge 7. The velocity of detonation of cord-like charges 9 and 10 are at least 50% greater than the velocity of detonation of the explosive charges 6 and 7. Connected at adjacent points to cord-like charges 9 and 10 are, respectively, initiating transmission means 11 and 12 which may be, for example, lengths of standard detonating cord or lengths of "Nonel" (Reg. trademark) energy transmission cord. Alternatively, cord-like charges 9 and 10 may be initiated by means of separate adjacent fast-acting electric detonators such as the exploding bridge wire type. Initiating means 11 and 12 are joined to a common detonator 13 which may be, for example, an electric blasting cap. Band charges 6 and 7 may be provided by the explosives manufacturer in preassembled units with cord-like charges 9 and 10 and initiating means 11 and 12 attached thereto. Charge 7 may be made in the form of a wheel and is tailored to fit exactly within male pipe end 1. Charge 6 may be made in the form of a flexible belt having a length equal to the outside circumference of flared end 3 and ready for securing thereto by means of tape, contact cement, or the like.

In use in the field in the construction of a pipeline, a prepared welding explosives charge 7 having cord-like initiating charge 10 and initiation transmission means 12 attached thereto, is fitted within the circumference and close to the cleaned end 1 of a pipe 2. A second similar sized pipe 4, having an outwardly flared cleaned end 3 is abutted against the leading edge of pipe end 1 so that end 1 is overlapped by the flared section 3. A prepared explosive charge 6 having cord-like initiating charge 9 and initiation transmission means 11 attached thereto, is fitted around the outside circumference of flared end 3 to directly overlay internal charge 7. Initiation transmission means 11 and 12 of equal length and with their points of connection to cord-like charges 9 and 10 being superimposed, are passed along the outside and inside respectively of pipe 4 to the end remote from the flared end 3 where they are jointly connected to a single detonator 13. Prepackaged tamping materials 14 and 15 are secured over charges 6 and 7. Upon ignition of detonator 13, energy shock waves are simultaneously transmitted along initiation transmission means 11 and 12 where they reach and simultaneously set off cord-like explosive charges 9 and 10. Because cord-like charges 9 and 10 are of substantially greater detonation velocity than the explosive which comprises charges 6 and 7, the detonation fronts in welding charges 6 and 7 propagate faster around the pipe than along the pipe axis. The detonation fronts are thus inclined at a large angle to the pipe axis. At the termination point, diametrically opposite the initiation point, the detonation fronts in the charges 6 and 7 meet at a large angle to reduce the damaging effect of the head-on collision of detonation fronts.

As will be appreciated by those skilled in the art, the detonation velocity of the explosive used in cord-like charge 10 will necessarily have to be prepared having a calculated valve slower than that of cord-like charge 9 to compensate for a shorter circumferential distance inside the pipe and to maintain an equal and opposite balancing force on the pipes during the simultaneous detonation of charges 6 and 7. A suitable cord-like initiator which may be so prepared is the hollow detonating fuse described by Prior in U.S. Pat. No. 3,730,096. Upon the detonation of charge 6, flanged and cleaned end 3 is driven inward against the outside circumferences of cleaned pipe end 1 which is simultaneously driven outward by the explosive force from charge 7. These forces are such that the pipe comprising flanged end 3 and pipe end 1 are welded together at their areas of contact over the entire circumference of pipe 1 and over substantially the whole length of the contact area to form a welded connection as depicted in FIG. 2. All of the explosive material used as well as any package, wrappings or supports are either consumed in the explosions or are left in a form which can be easily cleaned by conventional methods.

The amount and kind of explosive used for the welding charges 6 and 7 will depend upon the type of metal being welded, its strength characteristics, its melting temperature, its thickness and the like. From a knowledge of the properties of both metals and explosives, a charge type can be selected to produce sufficient pressure at the weld site to achieve the desired results. Typical of the explosives found useful in metal welding are amatol (mixture of TNT and ammonium nitrate), ANFO (ammonium nitrate/fuel oil mixtures), slurries, nitroglycerine-based dynamites and gelatins, and sheet explosives. These welding explosives generally have detonation velocities ranging from about 3000 M to about 5000 M per second. The cord-like charges employed to initiate the welding charges comprise explosive material, preferably detonating cords, having a very high detonation velocity, essentially at least 50% greater than the detonation velocity of the welding charge explosive. Unless the detonation velocity of the cord-like initiating charges are at least 50% greater than that of the welding explosive charges, unsatisfactory results are produced due to the propagation of a mainly circumferential shock wave and the damaging effect of colliding shock waves at a point 180° from the point of initiation. A high detonation velocity hollow cord as disclosed by Prior in U.S. Pat. No. 3,730,096, which may have a detonation velocity as high as 8000 M per second or more may be simply incorporated or fixed along the edge of the welding explosive charge in the explosive factory and may also be easily connected to an initiation transmission means such as low energy detonating cord or "Nonel" (Reg. Trademark) energy transmission cord. A further and surprisingly unexpected advantage may be gained by employing a hollow type detonating cord as the initiation means for the welding explosive charge. It has been observed that when a length of this hollow type cord is placed on a soft metal plate and is initiated simultaneously at each end, the point at which the explosive waves meet (the Dautriche effect), as indicated by an impression left on the metal plate, is doubled. That is, two spacedapart marks or impressions are left on the metal plate instead of the single mark left when conventional solid core detonating cord is used. It is seen therefore that it is an intrinsic quality of the hollow type cord to more widely distribute or dissipate the energy from meeting shock waves and hence the damaging effect on the metal against which the detonation takes place is reduced.

The following example describes the welding of two shortened sections of standard 48 inch (122 cm) diameter steel pipe sections at a test site using the method of the invention.

EXAMPLE

Two part sections of large diameter pipe of the type used in the construction of large volume oil pipelines were selected for welding. The pipe was 48 inch (122 cm) in outside diameter and had a wall thickness of 0.72 inch (1.83 cm). An 11.5 inch (29.2 cm) length of one end of a first pipe section (female) was cleaned and flared outward at an angle of about 6° to the horizontal pipe wall. One end of the second (male) pipe section was cleaned and fitted into the female flared end of the first section to make circumferential contact between the inner face of the flared portion and the outer leading edge of the male end. This resulted in a 5 inch (12.7 cm) overlap of the flared section over the male end. Welding explosive charges made from amatol (80% ammonium nitrate and 20% TNT) having a detonation velocity of about 4000 M per second were prepared in curved cardboard containers which were assembled to form two continuous rings weighing about 24 pounds (10.9 kg) each. The rings had a rectangular stepped cross-section one inch (2.54 cm) thick×2.5 (6.4 cm) wide stepped to 0.75 inch (1.91 cm) thick×2.5 inch (6.4 cm) wide. The total width was 5 inch (12.7 cm) and the total length was made to fit the outside circumference of the female pipe section for one ring, and the inside circumference of the male pipe section for the other.

The first outside explosive welding charge was secured fully around the exterior circumference of the flange of the female pipe section with the thickest edge of the charge closest to the body of the pipe. The second inside explosive welding charge was fixed around the inside circumference of the male end of the second pipe section at a position where the charge was overlayed by the exterior charge, the thick edge being aligned with the end of the pipe. Along the middle of the thick edge of each charge package was secured an initiating length of high detonation velocity detonating cord having an explosive content of 110 grains of PETN per foot (360 grains of PETN per m) of length. The velocity of detonation (VOD) of the initiation cord used with the outside, flange-adjacent charge was 8450 m per second. The VOD of the cord used with the inner, male end-adjacent charge was adjusted to 7430 m per second or 13.7% less than the VOD of the outside cord in order to compensate for the 13.7% shorter length of the loop of the inside cord compared to the loop of outside cord. The reduced VOD was accomplished butting segments of fast and slow cords so that the average velocity was at the required value. To each length of the high VOD detonating (initiating) cord was connected a length of standard detonating cord sufficiently long to reach the pipe section end remote from the flanged end. The positions of the point of connection of the standard detonating cord lengths to the high VOD initiating cord were also overlayed so that initiation of both inner and outer welding charges would take place at exactly superimposed locations. These attached lengths of standard detonating cord were led to the open end of the female pipe section, joined together and commonly attached to a blasting cap. Both the inside and outside welding explosive charges were covered with a layer of dry sand packaged in cardboard container, of the same width as the explosive charges and 2½ inch thick in order to provide a tamping effect for the explosives. Upon ignition of the blasting cap, energy was simultaneously transmitted via the standard detonating cords to set off the high VOD hollow initiating cords causing, in turn, the simultaneous edge initiation of the inside and outside welding charges. The energy wave front produced by the detonation of the welding charges proceeded in a direction mainly across the width of the charge and hence substantially in a direction parallel to the pipe longitudinal axis and caused the overlapped pipe areas to be driven together to produce a continuous welded connection. An examination of a cut-away portion of the welded area showed that the fully welded area of the five inches long (12.7 cm) overlayed flange section was approximately 3 inches (7.6 cm) in length which area extended around the circumference of the pipe. An approximate one inch (2.54 cm) long section from the end of each of the male and female overlayed areas was not completely bonded due to end effects and the lower efficiency of the explosive in the run up. The pipe was carefully examined at a point 180° from the point of initial initiation of the high VOD hollow cord, for any evidence of structural damage or imperfect weld caused by possible circumferential-colliding wave fronts. No evidence of any such damage could be found. The weld was also compared with conventional electric arc welds in similar material for resistance to separation or rupture. The explosive weld was judged superior by several testing techniques. Because of the great strength of the explosive weld, it is assumed that any pipeline assembled by explosive welding method of the present invention would display improved resistance to leakage and to longitudinal rupture, common failures in oil and gas pipelines.

The welding method of the invention thus, unlike many prior art methods, requires no mechanical resistance such as an internal or an external die or mandrel in order to be practised. The method employs counterbalancing internal and external explosive forces in order to drive together the metal parts to produce a welded connection. The metal surfaces to be welded are assembled so that an acute angle of about 6° to 8° is described between their faces. Because of the method of initiation used, the wave fronts in the welding explosives are caused to move around the pipe while being maintained at superimposed location and at a large angle to the pipe axis and hence the damaging effects of unbalancing and colliding circumferential shock waves are reduced or prevented. The simplicity of the method of iniatiation and assembly of the charges in the field results in speedy, safe and economic operation.

We claim:
1. A method of welding together a pair of metal tube sections comprising:
 (a) Positioning the ends of two metal tube sections together in male/female telescoping relationship, the female tube end being flared outward at an acute angle to the wall of the tube and the male tube end being in contact with an inside circumference of the said female flared tube end,
 (b) placing a first continuous substantially band-like charge of a welding explosive against and around the exterior surface of the said female flared tube end,
 (c) placing a second continuous substantially band-like charge of welding explosive against and around the interior surface of the male tube end so that the two explosive bands are in a position substantially concentric and adjacent on opposite sides of the telescoped region,
 (d) providing initiating means for each of said welding explosive charges, said initiating means comprising a continuous elongated, cord-like charge of high explosives having a velocity of detonation at least 50% greater than the velocity of detonation of said welding explosive charges, the said elongated initiating charges resting in initiating contact with the edge of each charge at a point closest to the narrow diameter of said female flared pipe section, and
 (e) detonating the said welding charges simultaneously by the initiation of each of said cord-like initiation charges at a single initiation point on each cord-like charge, the initiation points being superimposed and opposite one another, the resultant detonation shock front from each of said welding charges moving around the pipe while maintaining a large angle to the tube axis to drive together said female flared section and said male tube end to form a welded connection.

2. A method of welding as claimed in claim 1 wherein the welding charges are covered with tamping material.

3. A method of welding as claimed in claim 1 wherein said interior cord-like initiating charge has a velocity of detonation proportionately less than the velocity of detonation of said exterior cord-like initiation charge to compensate for a reduced internal circumferential distance within the tube and so provide simultaneous initiation of both of said cord-like charges.

4. A method of welding as claimed in claim 1 wherein the amount of flare of said female tube is from 5° to 8° from the horizontal.

5. A method as claimed in claim 4 wherein the amount of flare of said female tube is 6° from the horizontal.

6. A method of welding as claimed in claim 1 wherein the said cord-like initiating charges comprise very high detonation velocity detonating cord.

7. A method as claimed in claim 6 wherein the said high velocity cord comprises a hollow core detonating cord.

* * * * *